United States Patent
Calassou (10) Patent No.: US 12,435,704 B2
(45) Date of Patent: Oct. 7, 2025

(54) COMBINED ENERGY PRODUCTION AND CARBON DIOXIDE MINERALIZATION PROCESS AND RELATED INSTALLATION

(71) Applicant: TotalEnergies OneTech, Courbevoie (FR)

(72) Inventor: Sylvain Calassou, Pau (FR)

(73) Assignee: TotalEnergies OneTech, Courbevoie (FR)

( * ) Notice: Subject to any disclaimer, the term of this patent is extended or adjusted under 35 U.S.C. 154(b) by 0 days.

(21) Appl. No.: 18/684,912

(22) PCT Filed: Aug. 18, 2022

(86) PCT No.: PCT/EP2022/073105
§ 371 (c)(1),
(2) Date: Feb. 20, 2024

(87) PCT Pub. No.: WO2023/021147
PCT Pub. Date: Feb. 23, 2023

(65) Prior Publication Data
US 2024/0376871 A1    Nov. 14, 2024

Related U.S. Application Data (60) Provisional application No. 63/235,464, filed on Aug. 20, 2021.

(51) Int. Cl.
*F03G 4/00* (2006.01)
*B01D 53/62* (2006.01)
(Continued)

(52) U.S. Cl.
CPC ............ *F03G 4/026* (2021.08); *B01D 53/62* (2013.01); *E21B 41/0064* (2013.01); *F03G 4/02* (2021.08);
(Continued)

(58) Field of Classification Search
CPC ..... F01L 1/2405; F01L 13/0005; F01L 1/143; F01L 1/267; F01L 1/2411; F01L 1/25;
(Continued)

(56) References Cited

U.S. PATENT DOCUMENTS 6,668,554 B1 * 12/2003 Brown ................ E21B 41/0064
60/641.2
8,640,462 B2 * 2/2014 Shnell ................. E21B 43/2401
60/641.2
(Continued)

FOREIGN PATENT DOCUMENTS

DE        32 47 111 A1    7/1983
DE      102 16 291 A1   10/2003
(Continued)

OTHER PUBLICATIONS

International Search Report issued in International Application No. PCT/EP2022/073105 dated Dec. 16, 2022.
(Continued)

*Primary Examiner* — Wesley G Harris
(74) *Attorney, Agent, or Firm* — Troutman Pepper Locke LLP (57) ABSTRACT

The process comprises recovering heat power from a geothermal fluid emitted at a hydrothermal active site at the bottom of a body of water, in particular at a bottom of a lake, a sea or an ocean; converting the recovered heat power into electricity in the body of water or at the surface of the body of water; powering at least an equipment with the electricity obtained from converting the recovered heat power; simultaneously injecting a carbon dioxide containing stream, in particular a stream of carbon dioxide dissolved in water, in a ground formation at a carbon dioxide injection site next to the hydrothermal active site to carry out a carbonation of the carbon dioxide in the ground formation.

17 Claims, 5 Drawing Sheets

(51) Int. Cl.
*E21B 41/00* (2006.01)
*F03G 4/02* (2006.01)
*F24T 10/20* (2018.01)
*F24T 50/00* (2018.01)

(52) U.S. Cl.
CPC .............. *F03G 4/069* (2021.08); *F24T 10/20* (2018.05); *F24T 50/00* (2018.05); *B01D 2257/504* (2013.01)

(58) Field of Classification Search
CPC ...... F03G 4/026; E21B 41/0064; F24T 10/20; F24T 50/00
See application file for complete search history.

(56) References Cited

U.S. PATENT DOCUMENTS

| | | | | |
|---|---|---|---|---|
| 2009/0047072 | A1* | 2/2009 | Reid | F24T 10/10 165/45 |
| 2017/0299226 | A1* | 10/2017 | Buscheck | F24T 10/20 |
| 2020/0173692 | A1* | 6/2020 | Buscheck | F03G 7/04 |
| 2022/0282695 | A1* | 9/2022 | Peviani | E21B 43/38 |
| 2023/0392485 | A1* | 12/2023 | Johnson | C01B 3/06 |

FOREIGN PATENT DOCUMENTS

| | | | | |
|---|---|---|---|---|
| DE | 102009055259 | A1* | 6/2011 | ................. F24J 3/06 |
| EP | 2998503 | A2* | 3/2016 | ............ E21B 33/10 |
| EP | 2 176 496 | B1 | 5/2018 | |
| WO | WO-2013025644 | A1* | 2/2013 | ................ B01J 7/00 |

OTHER PUBLICATIONS

Shnell, J. "Global Supply of Clean Energy from Deep Sea Geothermal Resources" GRC Transactions 33 pp. 121-126, total of 7 pages submitted (2009).

Clark, D., et al. "CarbFix2: $CO_2$ and $H_2S$ mineralization during 3.5 years of continuous injection into basaltic rocks at more than 250° C." Geochimica et Cosmochimica Acta 279:45-66 (2020).

Goldberg, D., et al. "A global assessment of deep-sea basalt sites for carbon sequestration" Energy Procedia 1 pp. 3675-3682 (2009).

Aradóttir, E. S. P., et al. "Toward Cleaner Geothermal Energy Utilization: Capturing and Sequestering $CO_2$ and $H_2S$ Emissions from Geothermal Power Plants" Transp Porous Med 108:61-84 (2015).

* cited by examiner

COMBINED ENERGY PRODUCTION AND CARBON DIOXIDE MINERALIZATION PROCESS AND RELATED INSTALLATION

CROSS REFERENCE TO RELATED APPLICATIONS

The present application is a U.S. National Phase application under 35 U.S.C. § 371 of International Patent Application No. PCT/EP2022/073105 filed Aug. 18, 2022, which claims priority of U.S. Provisional Patent Application No. 63/235,464 filed Aug. 20, 2021. The entire contents of which are hereby incorporated by reference.

BACKGROUND

The present invention concerns a combined energy production and carbon dioxide mineralization process.

Energy production at the present time strongly relies on technologies producing greenhouse gases such as carbon dioxide.

Hence, it is a common goal of every industry, in particular energy production industry to find sources of energy which do not produce carbon dioxide or/and to develop processes to very efficiently capture carbon dioxide.

Geothermal energy has been frequently used as a potential source of clean energy. Geothermal energy relies on the heat of the earth. Industrial geothermal energy is well known today, but unfortunately does not meet all the energetic needs of the future. Indeed, geothermal energy relies on drilling and depleting an aquifer which is recharged with heat by conduction from the neighboring rocks.

The potential production resulting from current industrial geothermal energy is therefore limited and also produces some carbon dioxide to be set in place.

One aim of the invention is thus to provide a widespread, very efficient and sustainable energy production process, which also has a negative or neutral global net production of greenhouse gases such as carbon dioxide.

SUMMARY

To this aim, the subject matter of the invention is a combined energy production and CO2 mineralization process comprising:
  recovering heat power from a geothermal fluid emitted at a hydrothermal active site at the bottom of a body of water, in particular at a bottom of a lake, a sea or an ocean;
  converting the recovered heat power into electricity in the body of water or at the surface of the body of water;
  powering at least an equipment with the electricity obtained from converting the recovered heat power;
  simultaneously injecting a carbon dioxide containing stream, in particular a stream of carbon dioxide dissolved in water, in a ground formation at a carbon dioxide injection site next to the hydrothermal active site to carry out a carbonation of the carbon dioxide in the ground formation.

The process according to the invention may comprise one or more of the following features, taken solely or according to any technical feasible combination:
  the hydrothermal active site comprises at least a precipitation chimney emitting the geothermal fluid, preferably a plurality of precipitation chimneys emitting the geothermal fluid;
  the hydrothermal active site is located at a geological plate boundary, in particular along a mid-oceanic rift, at a hot spot, at a transform fault or/and at volcanic arc zone;
  converting the recovered heat power comprises separating gases from solids in the geothermal fluid and producing a turbine driving gas flow, in particular a steam flow, from the separated gases to rotate at least a turbine producing the electricity;
  the process comprises recovering the solids to produce at least a metal, in particular, Li, Co, Cu, Zn, Pb;
  the process comprises obtaining at least a production gas in particular H2, He, CO2, CH4, H2S from the gases separated from the geothermal fluid;
  at least a production gas is an acid gas, the process comprising preparing an acid solution from the acid gas and injecting the acid solution along the carbon dioxide containing stream in the ground formation;
  the carbon dioxide stream comprises native carbon dioxide, a direct atmospheric capture carbon dioxide, and/or an industrially generated carbon dioxide;
  the carbonation of the carbon dioxide produces a solid attached to the ground formation in particular a carbonated rock from initial in-situ rocks, notably a Ophicalcite or a Liswanite rock;
  the process comprises transporting onshore the electricity obtained from converting the recovered heat power, to power an onshore equipment;
  the equipment powered by the electricity obtained from converting the recovered heat power comprises at least an off-shore electrolyzer producing at least hydrogen, the process including transporting the hydrogen produced off-shore to an on-shore location;
  the process comprises producing heat from the recovered heat power to heat the electrolyzer and/or to purify water to be electrolyzed in the electrolyzer.
  recovering heat power includes collecting the geothermal fluid emitted at a hydrothermal active site at the bottom of the body of water and transporting the collected geothermal fluid to a surface facility in an insulated pipe, to carry out converting the heat power into electricity at the surface facility;
  the temperature of the geothermal fluid emitted at a hydrothermal active site is greater than 200° C.;
  the geothermal fluid emitted at the hydrothermal active site is constantly regenerated by penetration of water from the body of water in the geological formation and by heating of said water by heat contact mantle rocks, or magma, creating a continuous hydrothermal loop;
  the distance between the hydrothermal active site and the carbon dioxide injection site is smaller than 1 km.

The subject matter of the invention is also a combined energy production and carbon dioxide mineralization installation, suitable for carrying out the process as described above.

BRIEF DESCRIPTION OF THE DRAWINGS

The invention will be better understood, based on the following description, given solely as an example, and made in reference to the appended drawings in which.

DETAILED DESCRIPTION

Figure 1:
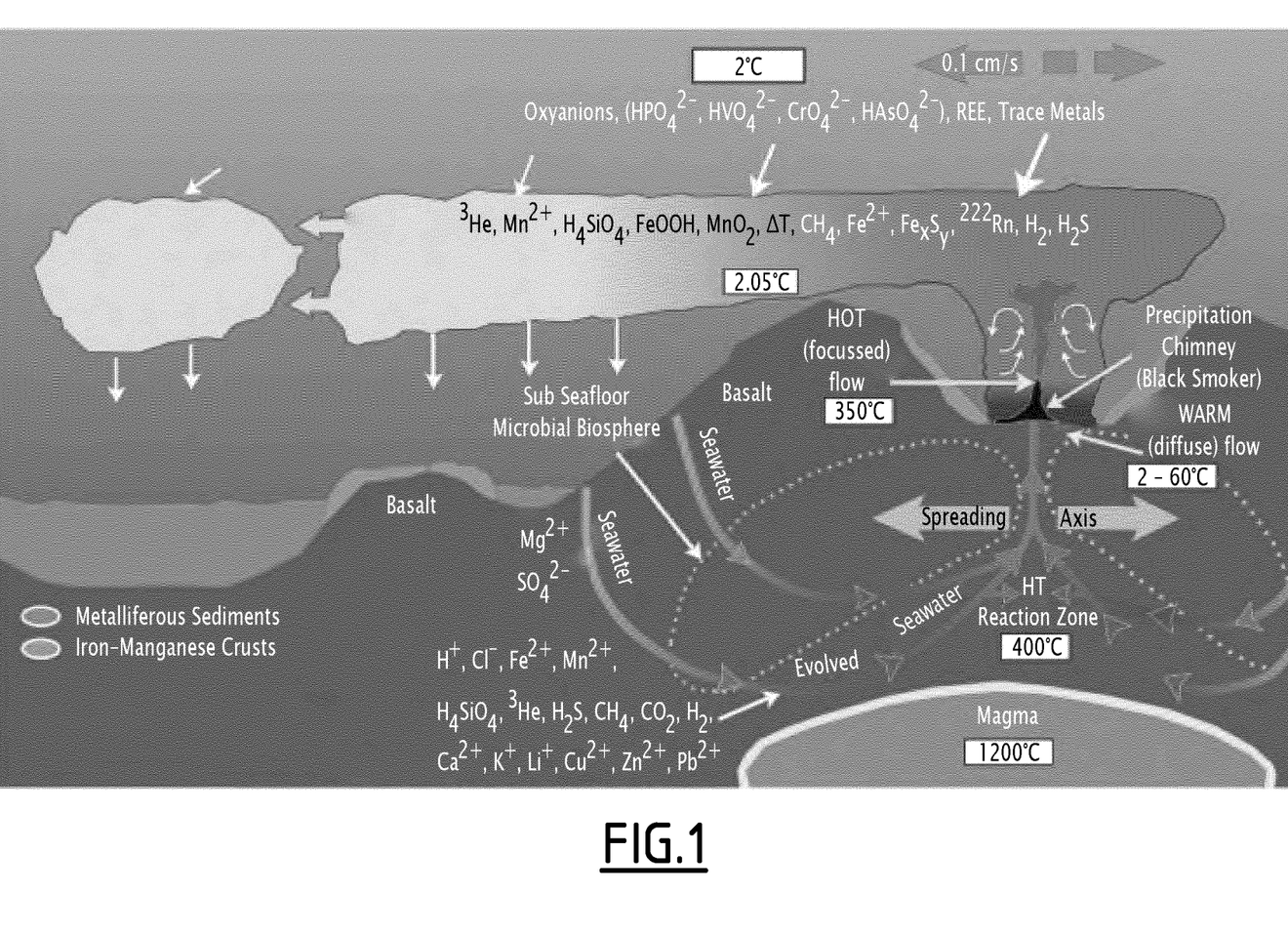
FIG. 1 is a schematic view of hydrothermal active site at the bottom of a body of water at which the process according to the invention can be carried out.
Figure 2:
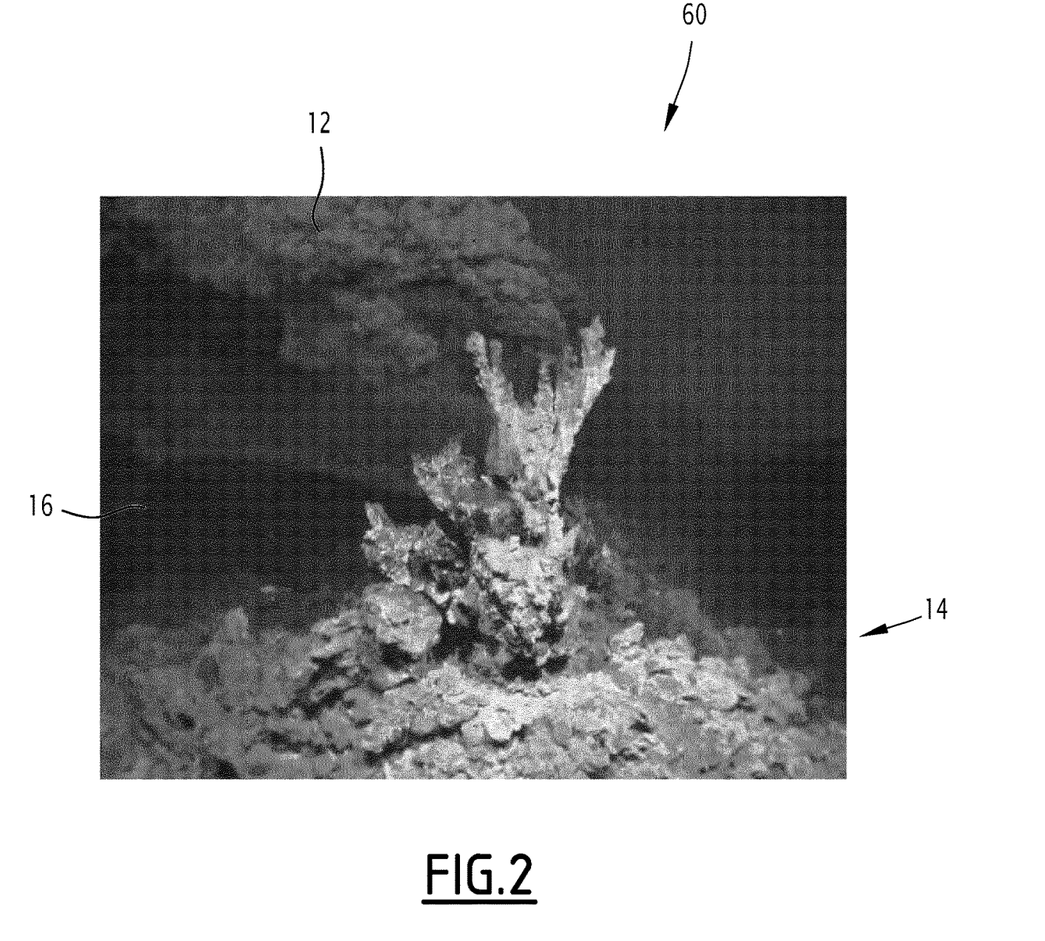
FIG. 2 is a view of a precipitation chimney or smoker emitting a high temperature (greater than 200° C.) geothermal fluid.
Figure 3:
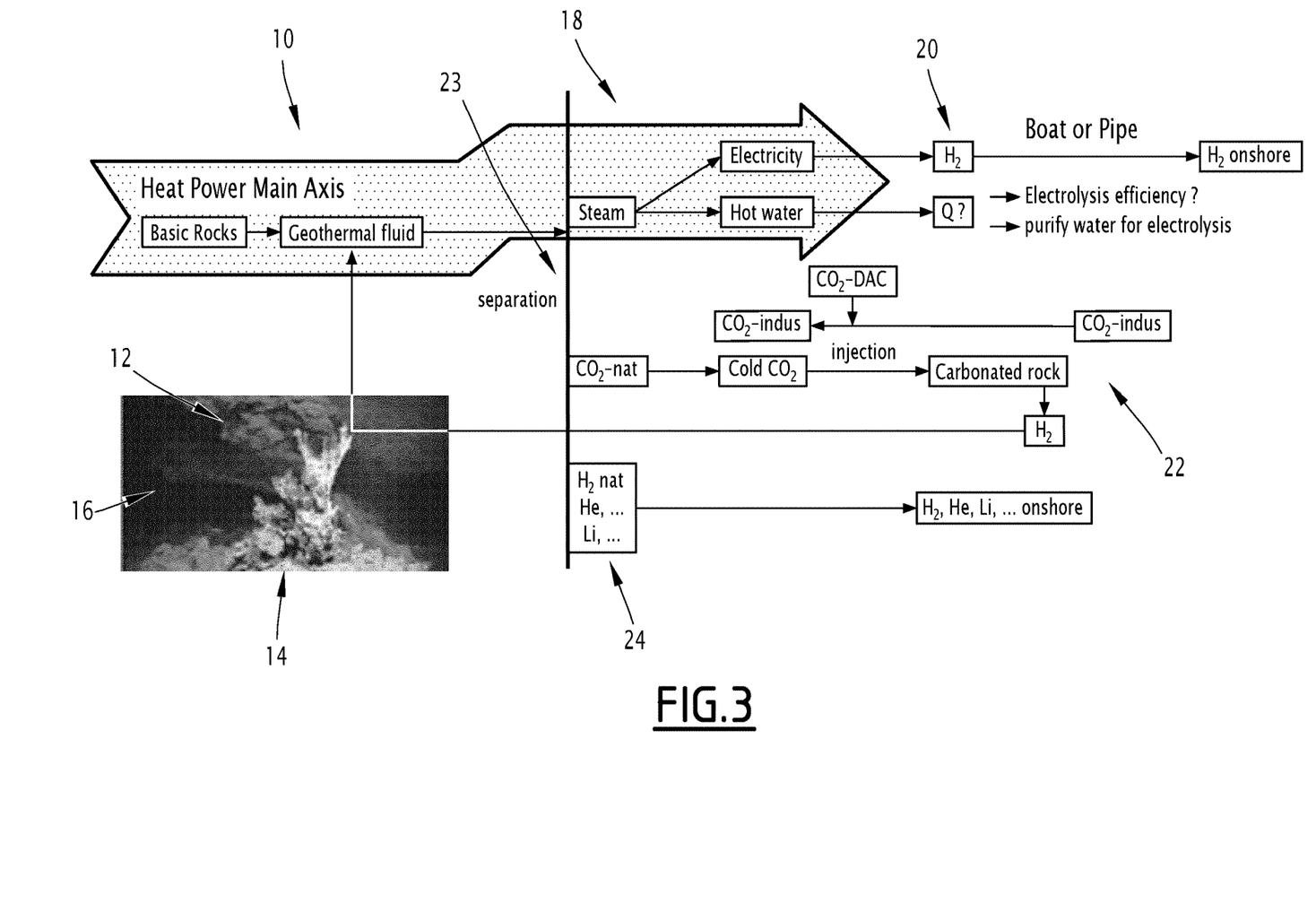
FIG. 3 is a schematic view of an example of installation for carrying out the process according to the invention.

An energy production process according to the invention is carried out at a hydrothermal active site shown for example in FIGS. 1 and 2, with an installation schematically shown in FIG. 3.

The hydrothermal active site is located at a bottom of a body of water such as a lake, a sea or an ocean. Generally, the depth at which the hydrothermal active site is located is greater than 10 m, in particular comprised between 10 m and 3000 m. The hydrothermal active site is preferably located at a tectonic plate boundaries like Mid-ocean ridges, Hot Sops, Back-Arcs, Transforms . . . .

The earth planet is a gigantic thermal machine, a huge nuclear power station, which is responsible for the movements of tectonic plates. At plate boundaries is released phenomenal amounts of heat power.

The heat power energy is dissipated in a spectacular way for example by hydrothermal vents as shown in FIG. 2. As shown in FIG. 1, the hydrothermal vent here comprises a precipitation chimney also referred to as a smoker. The chimney advantageously has a height generally comprised between few centimeters and few meters above the sea bottom, typically between 1 m and 10 m.

The vents are located underwater, along mid-oceanic rifts, hot spots, large transform faults or volcanic arc zones.

Each hydrothermal active site comprises a plurality of vents, for example more than 10 vents.

These hydrothermal active sites are known to be the cause of important ionic and chemical exchanges between the deep earth geological formations and the oceanic environment. In the case of a mid-oceanic rift, it is a plate boundary that accretes and pushes back the oceanic floors on either side of the rift by advection of the deep mantle as shown in FIG. 1.

This results in the upwelling of these mantle rocks, or magma, a few hundred meters to one kilometer from the ocean floor. As these rocks cool down, they shrink and fracture, allowing seawater to enter and creating hydrothermal loops that create the black or white smokers.

The geothermal fluid emitted at the hydrothermal active site is therefore constantly regenerated by penetration of water from the body of water in the geological formation and by heating of said water by heat contact mantle rocks, or magma, creating the continuous hydrothermal loop.

The chimneys have above all a role of releasing calories, the temperature reached by the geothermal fluid at the bottom of the water is often greater than 200° C. in particular between 200° C. and 400° C.

In addition to the temperature, the geothermal fluid is loaded with gases (Native H2 also known as H-nat, He, CO2, CH4, H2S, etc.) but also with polymetallic complexes (Li, Co, Cu, Zn, Pb, . . . ).

Contrary to geothermal energy, convective heat power is accessible on the ocean floor and is continually renewed by tectonic dynamics, and therefore cannot be depleted on a human 100 years scale.

As shown in FIG. 3, the installation used to carry out the process according to the invention comprises at least one recovery unit 10 configured to recover heat power from a geothermal fluid 12 emitted at the hydrothermal active site 14 at the bottom of a body of water 16. It comprises at least one conversion unit 18 configured to convert the recovered heat power into electricity in the body of water 16 or at the surface of the body of water 16. It further comprises at least an equipment 20 which is electrically connected to the conversion unit 18 to be powered with the electricity obtained from converting the recovered heat power.

According to the invention, the installation also comprises a carbon dioxide injection unit 22 configured to simultaneously inject a stream of carbon dioxide dissolved into cold water (at a temperature generally comprised between 2° C.-25° C.) in a ground formation next to the hydrothermal active site 14 to carry out a carbonation of the carbon dioxide in the ground formation.

The cold water can be for example seawater, freshwater or condensed water vapor from the steam turbine.

The recovery unit 10 is located at the bottom of the body of water to capture the geothermal fluid 12 emitted from the chimney(s) to convey it to the converting unit 18.

The converting unit 18 is located in the body of water 16 or/and at the surface of the body of water 16, for example at a surface facility such as a platform or a barge.

It comprises at least a separator 23 configured to separate the gases from solids in the geothermal fluid and configured to produce a turbine driving gas flow, in particular a steam flow, from the separated gases. The converting unit 18 also comprises at least a turbine producing the electricity, the turbine being configured to be rotated by the turbine driving gas flow.

The separator 23 is also able to separate production gases such as H2, He, CO2, CH4, H2S from the gases separated from the geothermal fluid.

The installation further comprises a treatment unit 24 able to treat the separated gases depending on their application. Helium, methane and hydrogen can be transported onshore to be used or sold. H2S can be used to prepare an acid solution from the acid gas and injecting the acid solution along the carbon dioxide containing stream in the ground formation via the injection unit.

The treatment unit 24 is also able to treat the dissolved and/or suspended metallic and mineral resources separated from the geothermal fluid to produce advantageously metals in particular, Li, Co, Cu, Zn, Pb. The metals can then be carried out onshore.

The injection unit 22 is able to inject a carbon dioxide containing stream at the same hydrothermal active site 14. Indeed, basic or ultra-basic rocks present in formations around such sites 14 are able to react with CO2. Depending on the pH of the water, these rocks will constitute a natural DAC (Direct Atmospheric Capture) at ambient temperature, or, in hydrothermal conditions (higher temperatures) below water, be capable of storing either by Ophicalcites or by Liswanites or by other carbonated rocks which can concentrate up to 60% of CO2 by mass in the rock.

Thus, the carbonation of the carbon dioxide produces a solid attached to the ground formation in particular an Ophicalcite or a Liswanite rock.

The injected carbon dioxide containing stream is in particular a stream of carbon dioxide dissolved in water. It can be native carbon dioxide obtained from the separation of the geothermal fluid in the separator 23, a direct atmospheric capture carbon dioxide transported from an on shore or offshore facility to the injection site of the injection unit 24, and/or an industrially generated carbon dioxide transported from an on shore or offshore facility to the injection site of the injection unit 24.

The mass content of carbon dioxide in the injected carbon dioxide containing stream is preferably greater than 2.5 mass %, preferentially greater than 20 mass %, more preferentially greater than 40 mass %, and even more preferentially, greater than 60 mass %.

Carrying out a reinjection of carbon dioxide at the same site 14 at which the geothermal fluid is produced is therefore extremely efficient in terms of carbon dioxide capture, which maximizes the potential for reduction of carbon dioxide in the atmosphere. Moreover, the capture is irreversible, since a carbonation reaction in the ground transforms preferentially in presence of the acid flow, transform the carbon dioxide into solids which are irreversibly trapped in the formation.

There is therefore a strong synergy between the heat power recovery to produce electricity and the carbon dioxide capture at the same hydrothermal active site 14.

Preferentially the distance separating the injection sites from the chimney(s) is smaller than 1 km, in particular comprised between 10 m and 1 km.

The carbon dioxide stream is preferably injected in a rock at a temperature greater than 50° C., and in particular comprised between 80° C. and 120° C. This optimizes the capture.

In the embodiment of FIG. 3, the equipment 20 powered by the electricity obtained from converting the recovered heat power comprises at least an off-shore electrolyzer producing at least hydrogen. The hydrogen produced offshore is transported to an on-shore location via a pipe or/and barges. The hydrogen can then be used as a fuel to produce electricity or to power engines.

In a variant, the electricity obtained from converting the recovered heat power in the converting unit 18 is transported onshore through power cables to power an onshore equipment.

Advantageously, the installation comprises at least a heat exchanger 26 to produce heat from the recovered heat power to heat the electrolyzer and/or to purify water to be electrolyzed in the electrolyzer.

Preferentially, the installation comprises a hydrothermal farm to capture hydrothermal fluids from hydrothermal vents or from a light geotechnical well. This is advantageous as the hydrothermal activity can be observed, and measured directly at sea bottom, reducing the geoscience risk. There is no necessity to drill a buried aquifer because oceanic waters are the aquifer.

Using several installations at several hydrothermal sites at plate boundaries such as the mid-Atlantic ridge, Red-Sea, Golf of California, Italy, etc, for example using 200 offshore installations would lead to a yearly electricity production equivalent to the one of France (60,000 MW), plus a massive capacity of CO2 sequestration by hydrothermal carbonation.

A potential method for setting up such an installation would comprise the steps of:

1.1 Site identification
   a. Define a tectonic plate limit, hot point, or active magmatic chamber for which an active hydrothermalism can be observed with high temperature of geothermal fluids expelled from smokers;
   b. Define the sustainability (long term of the system) mainly thanks to a kinetics of the plates obtained worldwide by GPS;
   c. Confront and extrapolate from established scientific sites the temperatures, thanks to global heat flux maps for example and to IODP sinks or any other direct or indirect temperature data;
   d. Check the bathymetry of the sites;
   e. Determine distance to industrial sales site (electricity, Hydrogen, Heat, Industrial site for CO2 capture, CO2 transport route, Customers of metal and gas resources)

2. Site qualification-Environmental impact study
   a. Obtain by bathy HR (radar or other) the hydrothermal smoker density per $km^2$.
   b. Calculation of a potential thermal Watt/km
   c. Nature of rocks (basalts, gabbros, basic or ultrabasic)
   d. Measurement of the compositions and concentrations of the constituent elements of the geothermal fluid as well as its variability
   e. Monitoring over a few months to assess an evolution 3. Techno-Construction of a dimensioned offshore geothermal power plant
   a. Provide re-injection or injection of CO2 in the cold circuit but in a rock that is still hot (100° C.)
   b. Design the storage/export of gas and metal resources based on the results of the monitoring;
   c. Design the electricity export, either by cable or by production of H2 by water electrolysis (plan the electrolysis process)

3. Carbonation
   a. CO2 injection can be either of native origin, or from a DAC, or industrial;
   a. Identification of the injection site by measuring the temperature around 100° C. and above in order to optimize carbonation.
   b. H2S could be important in acidifying the injection water and improving the mineralization reaction.
   c. Determine if a small buried borehole (a few tens of meters, smaller than 100 m can be used. Consequently, the drilling site may be not far from the production site but large enough to provide for several injectors.

4. Carbonation monitoring
   a. Installation of a sensor to detect leaks
   b. Core drilling before injection and during injection
   c. Use Isotopic tracer such as $\delta44/40$ Ca for example, as well as Na 5. Upsides
   a. Determine nature and concentration of recovered gases
   b. Determine nature and concentration of metal resources FIG. 4 depicts another example of an installation for combined energy production and carbon dioxide mineralization in which the process according to the invention is carried out.

The installation 10 is located a hydrothermal active site 14 which is similar to the hydrothermal active site described above in view of FIG. 1.

Figure 4:
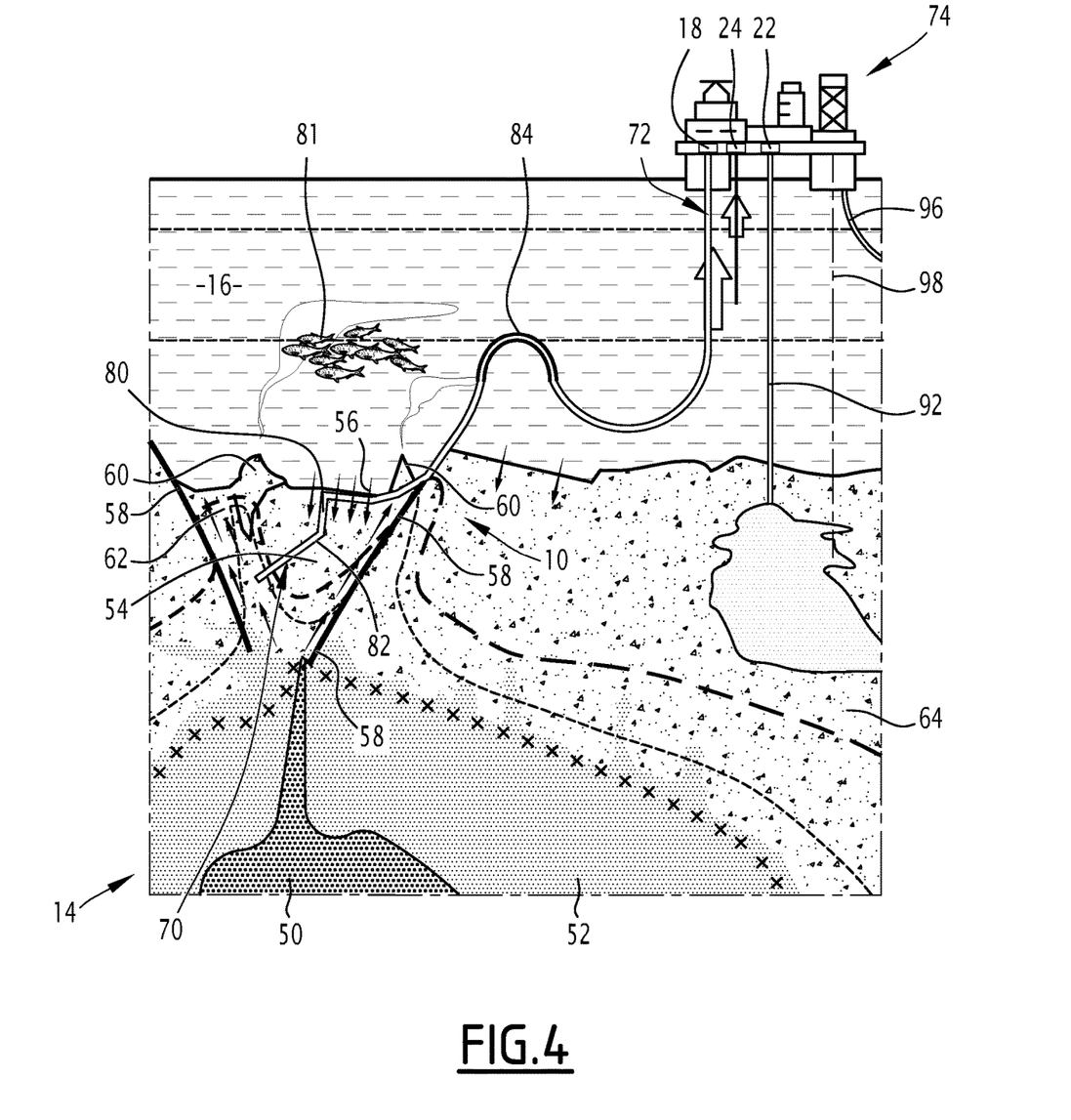
FIG. 4 is a schematic view of another example of installation for carrying out the process according to the invention.

In the example of FIG. 4, the hydrothermal active site 14 comprises a magmatic chamber 50, delimited around by sheeted dykes 52.

The hydrothermal active site 14 further comprises, above the magmatic chamber 50 and the sheeted dykes 52, a fractured zone 54 in which water from the body of water 16 is able to enter and circulate to create a hydrothermal loop 56.

The fractured zone 54 is here delimited by lateral faults 58. It comprises at the surface, active vents 60 which emit a flow of heated water into the body of water 16.

As defined above, the vents comprise precipitation chimneys also referred to as "smokers". In the example of FIG.

4, the smokers are preferably black smokers emitting hot water at temperatures above 200° C.

The hydrothermal active site 14 hence delimits, around the magmatic chamber 50 up to the active vents 60, a hot zone 62 in which temperature of the water circulating in the hydrothermal loop 56 is greater than 350° C., in particular greater than 400° C. In the hot zone 62, the pressure of the water is also greater than 100 bars, preferably greater than 200 bars, in particular greater than 300 bars.

Advantageously, the water present in the hot zone 62 and circulating in the hydrothermal loop 56 is supercritical.

In the hydrothermal loop 56, the cold water continuously enters the hydrothermal active site 14 through fractures in the fractured zone 54 and heats up in contact with the magma and/or rocks around and above the magmatic chamber 50 before being expelled through fractures in the hot zone 62 to the vents 60.

The hydrothermal active site 14 also defines, around the hot zone 62 and at a distance thereof, a cold zone 64 in which reinjection of the carbon dioxide is carried out. The cold zone 64 has a temperature smaller than 120° C., and generally comprised between 50° C. and 120° C.

In the embodiment of FIG. 4, the recovery unit 10 of the installation comprises at least a well 70, bored in the fractured zone 54, and at least a riser 72, connecting the well 70 to a surface facility 74 such as a platform or a barge.

The well 70 emerges at the bottom of the body of water 16, above the fractured zone 54. It comprises an upper vertical section 80, which emerges at a position located between active vents 60.

This location is preferably chosen to minimize disturbances to wildlife 81 present around the active vents 60.

The well 70 further comprises a lower inclined section 82 which opens downhole in the hot zone 62, preferably below a vent 60. The well is thus able to sample hot water present in the hot zone 62, the hot water being a geothermal fluid which is emitted at the hydrothermal site 14.

The well 70 is preferably insulated to limit heat losses when conveying the geothermal fluid sampled in the hot zone 62.

The depth of the well 70, taken vertically from the bottom of the body of water 16 is greater than 100 m, in particular greater than 400 m and for example comprised between 500 m and 1000 m.

The riser 72 is preferably an insulated pipe. It connects the top of the well 70 to the surface facility 74 in order to transport the geothermal fluid from the hot zone 62 to the surface facility 74.

The riser 72 is for example a flexible riser preferably having a lazy S shape, with a buoyancy zone 84.

The converting unit 18 is here located at the surface of the body of water 16 preferably on the surface facility 74. Preferably, the separator 23 is located on the surface facility 74 to separate the gases from solids in the geothermal fluid to produce the turbine driving gas flow, in particular the steam flow, and also production gases including hydrogen, helium, carbon dioxide, methane and/or hydrogen sulfide.

The treatment unit 24 is also preferably located on the surface facility 74. It is able to treat the dissolved and/or suspended metallic and mineral resources separated from the geothermal fluid to produce metals which can be carried onshore.

The injection unit 22 connects the surface facility 74 to the cold zone 64 in which the carbon dioxide containing stream is reinjected.

Figure 5:
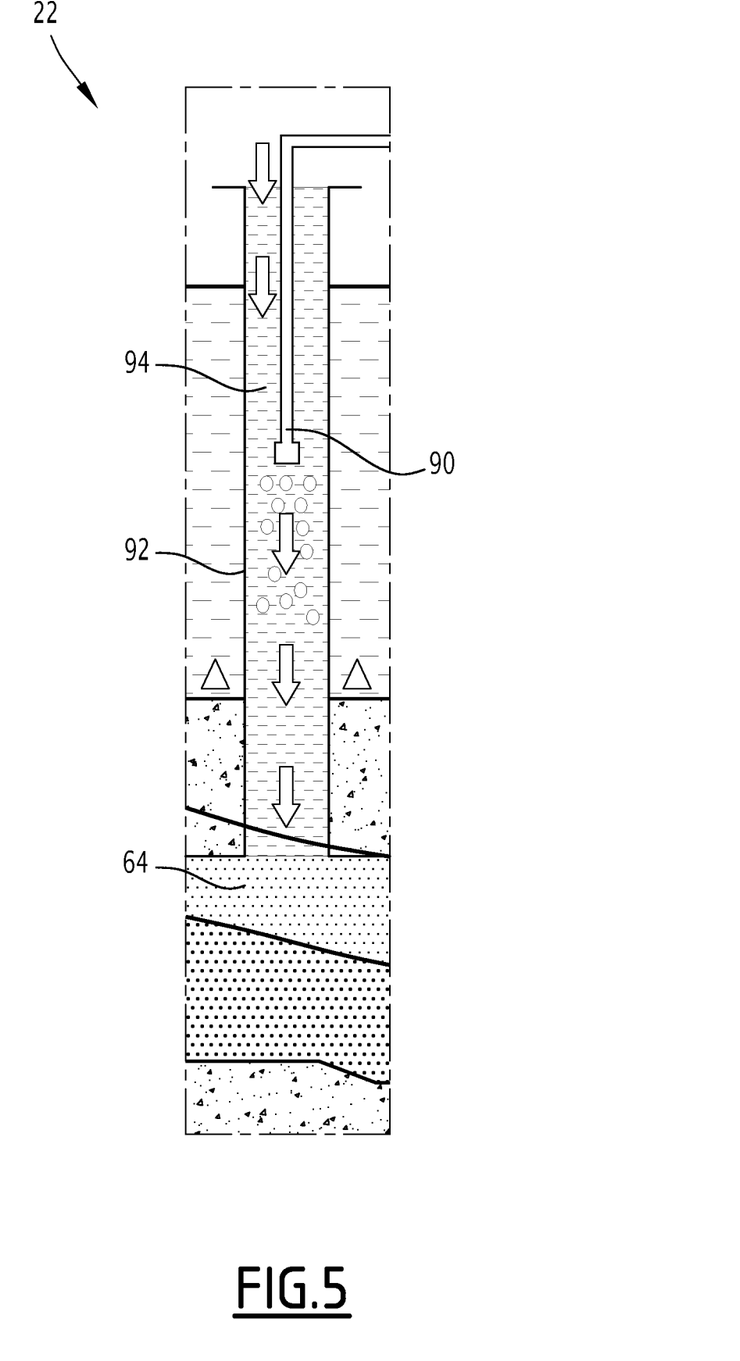
FIG. 5 is a detail of the installation of FIG. 4 showing a carbon dioxide containing stream injection unit.

In the particular example of FIG. 5, the injection unit 22 comprises an inner pipe 90 transporting gaseous carbon dioxide and an outer transportation pipe 92 in which the inner pipe 90 emerges.

The inner pipe 90 is connected to a source of gaseous carbon dioxide on the surface facility 74. The carbon dioxide is for example provided by separation of the geothermal fluid, and/or is a direct atmospheric captured carbon dioxide and/or is an industrially generated carbon dioxide.

The inner pipe 90 opens downwardly above the bottom of the body of water 16, at least 400 m above the bottom of the body of water 16.

The outer pipe 92 defines, around the inner pipe 90 an annular space 94 which is fed by water depleted in carbon dioxide (i.e. having a volume concentration of carbon dioxide for example smaller than 1%). Thus, the injection of carbon dioxide from the bottom of the inner pipe 90 is carried out directly into the water depleted in carbon dioxide to produce a carbon dioxide containing stream to be reinjected next to the hydrothermal active site 14.

The outer pipe 92 extends downwardly at least to the bottom of the body of water 16 and preferentially to the injection site in the cold zone 64.

The carbon dioxide containing stream has a density greater than the density of the water depleted in carbon dioxide contained in the annular space 94. Thus, the carbon dioxide containing stream naturally flows towards the cold zone 64 in which it is injected back into the ground.

A combined energy production and carbon dioxide mineralization process, carried out in the installation of FIG. 4, will now be described.

As mentioned above, a hydrothermal loop 56 forms at the hydrothermal active site 14 from water present in the body of water 16 feeding the fractures defined in the fractured zone 54. The water is heated by heat contact with mantle rocks or magma, creating a heated geothermal fluid which raises to the vents 60 through the hot zone 62 to be emitted back in the body of water.

The geothermal fluid located in the hot zone 62 has a temperature well above 200° C., in particular above 350° C., and in particular comprised between 350° C. and 450° C. The pressure of the geothermal fluid at this location is above 200 bars, in particular between 250 and 350 bars. The geothermal fluid is in a supercritical state.

The geothermal fluid is then sampled continuously through the lower inclined section 82 of the well 70 and raises along the upper vertical section 80 of the well 70 to the riser 72. It then flows in the riser 72 to the surface facility 74.

The riser 72 being insulated, the heat losses are minimized. For example, the temperature of the geothermal fluid at the bottom of the riser 72 is comprised between 350° C. and 410° C. and the pressure of the geothermal fluid at the bottom of the riser 72 is comprised between 230 bara and 280 bara. At the top of the riser 72, the temperature of the geothermal fluid is for example comprised between 340° C. and 360° C., and the pressure of the geothermal fluid is for example smaller than 200 bars, notably comprised between 160 bars and 190 bars.

The proportion of steam into the geothermal fluid is preferentially greater than 75% in volume at the top of the riser 72.

As detailed above, the geothermal fluid is then introduced in the separator 23 to be separated into steam, which produces a turbine driving gas flow. The turbine is rotated by the turbine driving gas flow to produce electricity.

The separator 23 also separates production gases, and solids which are conveyed to the treatment unit 24.

In the treatment unit 24, the solids are treated such that metallic and mineral resources are separated from a liquid phase to produce metals which are carried onshore.

The carbon dioxide produced from the separator 23, advantageously along with a direct atmospheric captured carbon dioxide and/or with industrially generated carbon dioxide is reinjected back into the ground formation at the hydrothermal active site 14.

In the particular embodiment shown in FIG. 5, the carbon dioxide gaseous flow is conveyed through the inner pipe 90 to a depth located at least 400 meters above the bottom of the body of water 16. Water from the body of water 16, depleted in carbon dioxide, is simultaneously transported in the annular space 94.

The gaseous carbon dioxide is then diffused into the water depleted with carbon dioxide to produce the carbon dioxide containing stream.

The carbon dioxide containing stream is denser than the water depleted in carbon dioxide such that a natural downstream transportation of the carbon dioxide containing stream to the cold zone 64 occurs.

In the cold zone 64, the temperature of the carbon dioxide containing fluid is comprised preferentially between 50° C. and 120° C. The pH is advantageously above 5, and preferably comprised between 5 and 7. Under these conditions, a mineralization process occurs in the ground formation as described above. This creates a solid attached to the ground formation.

The electricity produced in the turbine of the surface installation 74 is used partially on site, and/or is carried onshore by a high voltage transportation cable 96. It can then be used by equipment 20 either on the surface facility 74 or onshore.

As mentioned above, the process according to the invention is particularly effective in recovering heat naturally generated at particular locations in the body of water 16 at hydrothermal active sites 14.

The heat power generated regenerates continuously along time. The process according to the invention is particularly efficient in recovering the heat power, and at the same time limiting the carbon dioxide production at the surface, and even consuming carbon dioxide to irreversibly capture it as a rock through carbonation.

The energy production process is therefore sustainable, widespread and very efficient. It has a negative or neutral global net production of greenhouse gases.

In a variant, shown in dotted lines in FIG. 4, the installation also comprises a probe 98 configured to measure a carbonation indicator at the injection site. The probe 98 for example extends from the surface facility 74 to the injection site. The probe 98 is for example configured to measure pH and/or concentration in carbonate ions at the injection site.

The probe 98 can be activated regularly or continuously to monitor the carbonation of the carbon dioxide at the injection site.

The invention claimed is:

1. A combined energy production and carbon dioxide mineralization process comprising:
   recovering heat power from a geothermal fluid emitted at a hydrothermal active site at the bottom of a body of water;
   converting the recovered heat power into electricity in the body of water or at the surface of the body of water;
   powering at least an equipment with the electricity obtained from converting the recovered heat power; and
   simultaneously injecting a carbon dioxide containing stream in a ground formation at a carbon dioxide injection site next to the hydrothermal active site to carry out a carbon dioxide carbonation in the ground formation,
   wherein a carbonation of the carbon dioxide produces a solid attached to the ground formation.

2. The process according to claim 1, wherein the hydrothermal active site comprises at least a precipitation chimney emitting the geothermal fluid or/and wherein the hydrothermal active site is located at a geological plate boundary.

3. The process according to claim 1, wherein recovering heat power comprises sampling geothermal fluid at the hydrothermal active site.

4. The process according to claim 3, wherein the sampling of geothermal fluid is carried out through a well having an upper section emerging at a distance from a precipitation chimney emitting the geothermal fluid, and an inclined bottom section emerging below a precipitation chimney.

5. The process according to claim 1, wherein converting the recovered heat power comprises separating gases from solids in the geothermal fluid and producing a turbine driving gas flow from the separated gases to rotate at least a turbine producing the electricity.

6. The process according to claim 5, comprising recovering the solids separated from the geothermal fluid to produce at least a metal and/or comprising obtaining at least one production gas from the gases separated from the geothermal fluid.

7. The process according to claim 6, wherein the process comprises obtaining at least one production gas from the gases separated from the geothermal fluid, wherein the at least one production gas is an acid gas, the process further comprising preparing an acid solution from the acid gas and injecting the acid solution along with the carbon dioxide containing stream in the ground formation.

8. The process according to claim 1, wherein the carbon dioxide containing stream comprises native carbon dioxide, a direct atmospheric capture carbon dioxide, and/or an industrially generated carbon dioxide.

9. The process according to claim 1, wherein the carbon dioxide containing stream is generated by injecting a gaseous carbon dioxide above the bottom of the body of water along with water from the body of water, such that the carbon dioxide containing stream spontaneously flows towards the ground formation, the pH of the gaseous carbon dioxide being smaller than 4, the pH of the carbon dioxide containing stream being greater than 5.

10. The process according to claim 1, wherein a temperature of the injection site of the carbon dioxide containing stream in the ground formation is smaller than 120° C.

11. The process according to claim 1, comprising measuring a carbonation indicator at the injection site.

12. The process according to claim 1, comprising transporting onshore the electricity obtained from converting the recovered heat power, to power an onshore equipment or wherein the equipment powered by the electricity obtained from converting the recovered heat power comprises at least an off-shore electrolyzer producing at least hydrogen, the process including transporting the hydrogen produced offshore to an on-shore location.

13. The process according to claim 1, wherein the recovering of heat power includes collecting the geothermal fluid emitted at the hydrothermal active site at the bottom of the body of water and transporting the collected geothermal fluid to a surface facility in an insulated pipe, to carry out converting the heat power into electricity at the surface facility.

14. The process according to claim 1, wherein a temperature of the geothermal fluid emitted at the hydrothermal active site is greater than 200° C.

15. The process according to claim 1, wherein the geothermal fluid emitted at the hydrothermal active site is constantly regenerated by penetration of water from the body of water in a geological formation and by heating of said water by heat contact with mantle rocks, or magma, creating a continuous hydrothermal loop.

16. The process according to claim 1, wherein the distance between the hydrothermal active site and the carbon dioxide injection site is smaller than 1 km.

17. A combined energy production and carbon dioxide mineralization installation, comprising:

a recovery unit configured to recover heat power from a geothermal fluid emitted at a hydrothermal active site at the bottom of a body of water;

a conversion unit configured to convert the recovered heat power into electricity in the body of water or at the surface of the body of water;

at least an equipment powered with the electricity obtained from the conversion unit; and an injection unit configured to simultaneously inject a carbon dioxide containing stream in a ground formation at a carbon dioxide injection site next to the hydrothermal active site to carry out a carbonation of the carbon dioxide in the ground formation, wherein the carbonation of the carbon dioxide produces a solid attached to the ground formation.

* * * * *